United States Patent
McClure

(10) Patent No.: US 8,350,684 B2
(45) Date of Patent: Jan. 8, 2013

(54) VEHICLE LANE DEPARTURE WARNING SYSTEM HAVING TRAILER MODE AND METHOD

(75) Inventor: Kirk E. McClure, Kokomo, IN (US)

(73) Assignee: Delphi Technologies, Inc., Troy, MI (US)

(*) Notice: Subject to any disclaimer, the term of this patent is extended or adjusted under 35 U.S.C. 154(b) by 561 days.

(21) Appl. No.: 12/636,821

(22) Filed: Dec. 14, 2009

(65) Prior Publication Data

US 2011/0140872 A1    Jun. 16, 2011

(51) Int. Cl.
*B60Q 1/00* (2006.01)

(52) U.S. Cl. ........ 340/435; 340/431; 340/901; 340/905; 340/937; 348/148; 348/149

(58) Field of Classification Search ................ 340/425.5, 340/438, 431, 435, 904, 905, 901, 933, 937; 701/209, 300; 348/148, 149
See application file for complete search history.

(56) References Cited

U.S. PATENT DOCUMENTS

| 6,317,057 | B1* | 11/2001 | Lee ............................ 340/901 |
| 7,050,908 | B1  | 5/2006  | Schwartz et al. |
| 2004/0042638 | A1* | 3/2004 | Iwano ........................ 382/104 |
| 2004/0107035 | A1* | 6/2004 | Tange et al. ................... 701/70 |
| 2010/0191421 | A1* | 7/2010 | Nilsson ......................... 701/41 |

* cited by examiner

*Primary Examiner* — Brent Swarthout
(74) *Attorney, Agent, or Firm* — Lawrence D. Hazelton

(57) ABSTRACT

A vehicle lane departure warning system and method are provided having a trailer mode. The system includes an imager capturing images of a roadway forward of a vehicle and an input receiving a towing signal indicative of whether the vehicle is towing a trailer. The system also includes a processor for processing the captured images and determining whether the vehicle or trailer is expected to be departing from a lane on the roadway based on the captured images and a threshold width value. The processor selects the threshold width value based on the input towing signal such that an enhanced threshold width value is employed when the vehicle is towing a trailer. An output is provided for outputting a lane departure warning signal based on the processed images and selected threshold width value.

14 Claims, 2 Drawing Sheets

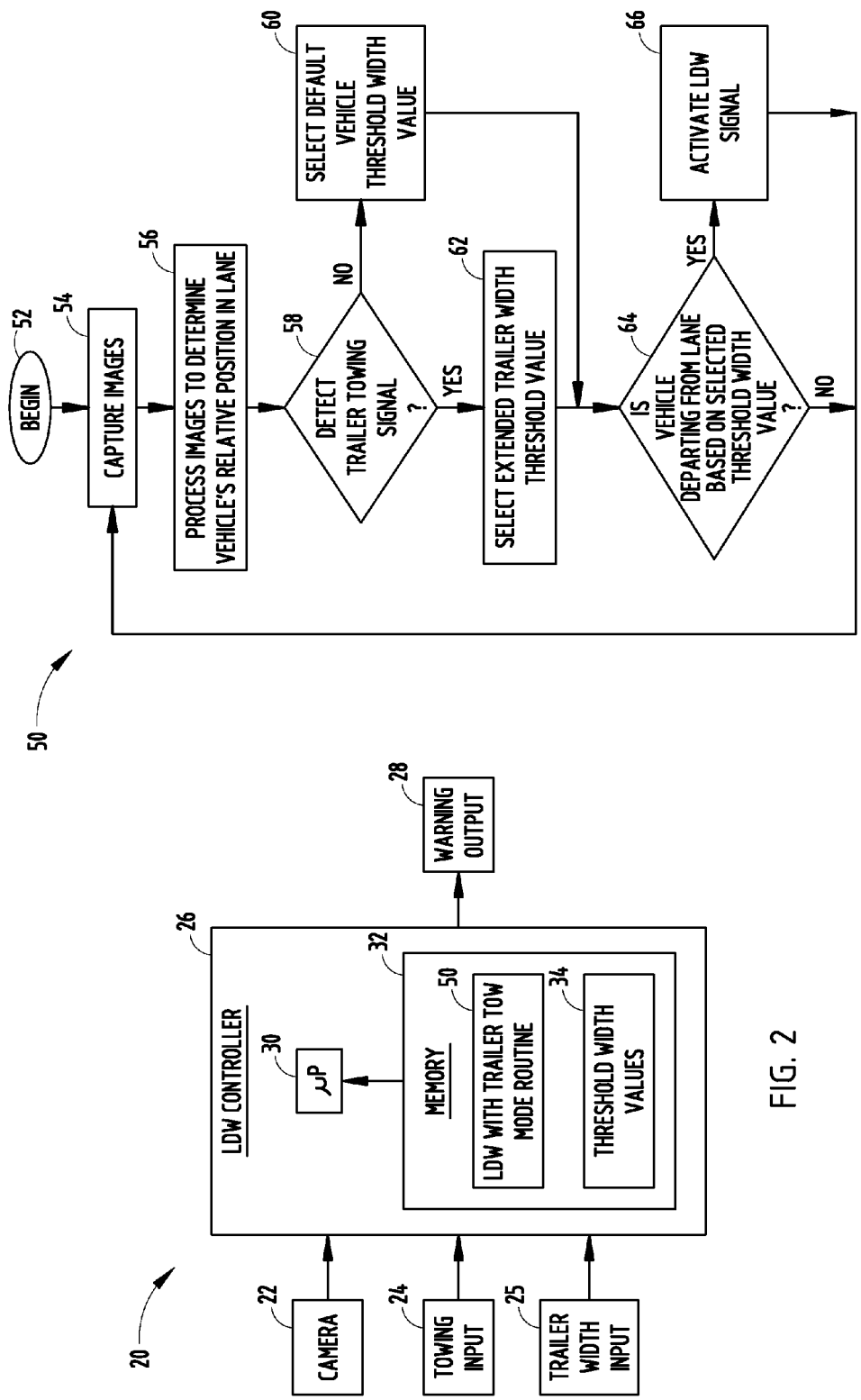

VEHICLE LANE DEPARTURE WARNING SYSTEM HAVING TRAILER MODE AND METHOD

TECHNICAL FIELD

The present invention generally relates to lane departure warning for a vehicle, and more particularly relates to detection and warning of a lane departure for a vehicle towing a trailer having a width wider than the tow vehicle.

BACKGROUND OF THE INVENTION

Lane departure warning (LDW) systems have been developed for vehicles to detect and warn of the vehicle's departure from a lane on a roadway. The LDW system typically employs one or more camera based vision systems mounted to the host vehicle which generate digital images of the roadway and lane markings forward of the vehicle. This may be achieved by monitoring the position of the vehicle relative to the lane boundary markings found on the roadway. A typical roadway may have a lane width of one about hundred forty-six (146) inches, as compared to conventional light duty host vehicle widths which are usually less than eighty (80) inches. The conventional proposed LDW systems typically calculate vehicle lane departure based on the width of the host vehicle. Typically, camera images are processed into scenes by a microprocessor to determine whether the vehicle is expected to be departing from the lane of the roadway based on processed image algorithms and a threshold width value, which typically is based on the width of the host vehicle.

While the currently proposed lane departure warning system may serve adequately well to determine departure of a vehicle from the roadway, limitations or drawbacks exist when the vehicle is towing a trailer, particularly, a trailer having a width wider than the host driving vehicle. For example, a trailer may have a width of one hundred two (102) inches, which is substantially greater than the width of the host vehicle. The conventional proposed LDW system operates based on the width of the host vehicle and may not adequately detect when the trailer first departs from the lane due to its extended width. The large discrepancy between the host vehicle width and the trailer width allows the trailer to depart from the lane before the conventional proposed LDW system may alert the driver of such an event.

Accordingly, it is therefore desirable to provide for an enhanced lane departure warning system that effectively detects the departure of the vehicle and its towed trailer from a lane on a roadway and does not suffer from the drawbacks or limitations of the conventional proposed LDW systems.

SUMMARY OF THE INVENTION

According to one aspect of the present invention, a vehicle lane departure warning system having a trailer mode is provided. The system includes an imager capturing images of a roadway proximate to a vehicle and an input receiving a towing signal (manual) indicative of whether the vehicle is towing a trailer. The system also includes a processor processing the captured images and determining whether the vehicle or trailer is expected to be departing from a lane on the roadway based on the captured images and a threshold width value, wherein the processor further selects the threshold width value based on the input towing signal (manual) such that an enhanced threshold width value is employed when the vehicle is towing a trailer. The system further includes an output for outputting a lane departure warning signal based on the processed images and selected threshold width value.

According to another aspect of the present invention, a method of detecting a vehicle departing from a lane on a road with a trailer mode is provided. The method includes the steps of capturing images of the roadway proximate to the vehicle, and processing the captured images to determine whether the vehicle or a trailer is expected to be departing from a lane on the roadway based on the captured images and a threshold width value. The method also includes the step of monitoring an input to detect a towing signal indicative of whether the vehicle is towing a trailer. The method further includes the steps of selecting the threshold width value based on the towing signal such that an enhanced threshold width value is employed when the vehicle is towing a trailer, and outputting a lane departure warning signal based on the processed images and the selected threshold width value.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 2 is a block diagram of the lane departure warning system according to one embodiment; and FIG. 3 is a flow diagram illustrating a routine employed in the lane departure warning system for detecting vehicle lane departure with a trailer mode, according to one embodiment.

DESCRIPTION OF THE PREFERRED EMBODIMENTS

Figure 1:
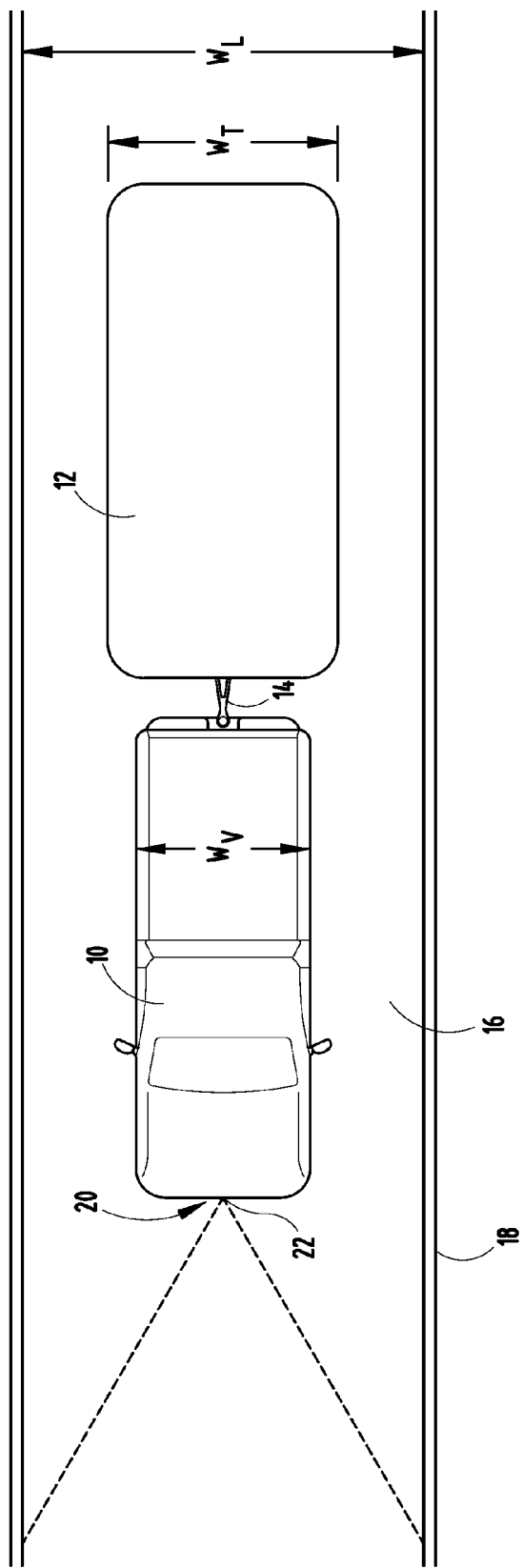
FIG. 1 is a schematic top view of a vehicle towing a trailer in a lane of a roadway and employing a lane departure warning system, according to one embodiment.

Referring now to FIG. 1, an automotive wheeled host vehicle 10 is generally illustrated having a trailer hitch 14 towing a trailer 12 within a lane 18 on a roadway 16. The host tow vehicle 10 is shown having a vehicle width $W_V$ as compared to a larger or extended trailer width $W_T$. The trailer 12 may be connected to the vehicle 10 via any of a number of tow hitches, such as a fifth wheel hitch, in a trailer tow mode and may be disconnected from the vehicle 10 such that the vehicle 10 may operate in a non-trailer tow mode without the trailer 12. The roadway 16 has one or more lanes 18 shown defined by lane boundary markings and each lane 18 has a lane width $W_L$.

The host vehicle 10 is equipped with a lane departure warning system 20 for detecting departure of the host vehicle 10 and its trailer 12 from the lane 18 of the roadway 16. The lane departure warning system 20 advantageously detects lane departure of the host vehicle 10 and its enlarged width trailer 12 in a trailer tow mode. The lane departure warning system 20 employs one or more camera imaging devices 22, shown located near the front of the host vehicle 10, for capturing images of the roadway 16 forward of the vehicle 10. The captured images are processed to detect and determine the boundary markings of the lane 18 and to determine whether the host vehicle 10 and/or its trailer 12 depart from lane 18. If a lane departure is detected, the system 20 generates a lane departure warning output. It should be appreciated that the lane departure warning system 20 is configured to provide a lane departure warning sufficient to detect departure of the extended width trailer 12 from lane 18 when the host vehicle 10 is operated in the trailer tow mode.

Referring to FIG. 2, the lane departure warning system 20 is illustrated employing a lane departure warning (LDW) controller 26. The controller 26 may include a controller dedicated to vehicle lane departure detection and warning according to one embodiment, or may be integrated with other vehicle control systems according to other embodiments. The lane departure warning controller 26 includes control circuitry shown as a microprocessor 30 and memory 32. Microprocessor 30 may include analog and/or digital control circuitry, according to various embodiments. Memory 32 may include random access memory (RAM), read-only memory (ROM), electronically erasable programmable read-only memory (EEPROM), flash memory and other known memory devices. Stored within memory 32 and executed by the microprocessor 30 is a LDW trailer mode routine 50 and two or more threshold width values 34. The routine 50 processes the captured images of the roadway 16 forward of the host vehicle 10 and determines whether the host vehicle 10 and/or trailer 12 is departing from a lane 18 on the roadway 16 based on a selected one of the threshold width values 34.

The lane departure warning system 20 employs one or more cameras 22 for providing generated images as an input to the LDW controller 26. Additionally, the lane departure warning system 20 has a towing input 24 for providing an input towing signal to the LDW controller 26. The input towing signal may include a signal supplied via the vehicle serial communication bus such as a CAN bus. The towing signal may be generated automatically when a trailer tow harness of the trailer 12 is connected to a tow harness of the host vehicle 10 indicating that the vehicle 10 is towing a trailer 12, according to one embodiment. According to another embodiment, the towing input 24 may include a discrete towing signal generated in response to an operator of the host vehicle 10 manually actuating a switch or other input to select a trailer tow mode. According to a further embodiment, the towing input 24 may include a user entered trailer width input 25 that may allow the user to input one or more signals that select from a plurality of different threshold width values for different width size trailers, which may be provided by way of a human machine interface (HMI) (e.g., menu based multi-mode switch). For example, a user may have one threshold width value from available threshold width values that corresponds to different trailer widths such as widths of ninety-two (92) inches or one hundred two (102) inches.

The lane departure warning system 20 further includes an output warning signal 28. The output warning signal 28 may include an audible alarm intended to quickly alert the driver of the vehicle 10 of the detected departure of the host vehicle 10 and/or its trailer 12 from the lane of the roadway. The output warning signal 28 could include other outputs, such as a visual display, a haptic output, such as a vibrating seat, serial communications data scheme, or other warning outputs. It should further be appreciated that the lane departure output warning signal 28 may be provided to other systems for use in other applications onboard the vehicle 10, such as collision avoidance, as should be evident to those skilled in the art.

In operation, the lane departure warning system 20 receives video images captured by the camera 22 generally forward of the host vehicle 10 which include the lane boundary markings defining the lane 18 of the roadway 16 such that the relative position of the vehicle 10 and its trailer 12 relative to the lane 18 can be determined. The captured images are processed to determine whether the host vehicle 10 and/or its trailer 12 is expected to be departing from the lane 18 on the roadway 16 based on the captured images and a selected threshold width value. Normally, in a non-trailer tow mode without a trailer, the threshold width value is based on the width $W_V$ of the vehicle 10. The lane departure warning system 20 further selects the threshold width value based on the towing signal such that an enhanced threshold width value is employed when the host vehicle 10 is towing a trailer 12 in the trailer tow mode. Thus, the width $W_T$ of the trailer 12 is taken into consideration to allow the lane departure warning system 20 to detect when the trailer 12 has departed from the lane 18 of the roadway 16.

The lane departure warning with trailer mode routine 50 is illustrated in FIG. 3 according to one embodiment. Routine 50 begins at step 52 and proceeds to step 54 to capture the images forward of the host vehicle with the camera. Next, at step 56, routine 50 processes the captured video images to determine the host vehicle's relative position within a lane of the roadway. At decision step 58, routine 50 determines whether a trailer towing signal has been detected. If no trailer towing signal has been detected, routine 50 proceeds to step 60 to select the default vehicle width threshold value, such that the lane departure warning system operates in a non-trailer towing mode. In the non-trailer tow mode, the default vehicle width threshold value is typically based on the vehicle width $W_V$ and is used to determine lane departure. If a trailer towing signal has been detected in step 58, routine 50 proceeds to step 62 to select the extended trailer width threshold value so as to set the routine 50 in a trailer towing mode. Accordingly, an extended width threshold value is employed in the trailer mode to determine lane departure, as compared to the non-trailer mode. It should be appreciated that multiple trailer mode extended width threshold values may be available to select from so as to accommodate different trailer widths. Once the width threshold value is set, routine 50 proceeds to decision step 64 to determine if the host vehicle and/or its trailer is departing from the current lane based on the selected threshold value and, if so, activates the LDW warning signal at step 66. Accordingly, routine 50 advantageously selects the vehicle width threshold value from a plurality of threshold values to allow the lane departure warning system to operate in a trailer mode and a non-trailer mode with enhanced effectiveness.

Routine 50 generally illustrates one embodiment of a lane departure warning routine that selects a threshold width value in a trailer tow mode. However, it should be appreciated that the principles of the present invention may apply to use in connection with other lane departure warning systems according to other embodiments. For example, the routine 50 could be modified to operate with a lane departure warning system disclosed in U.S. Pat. No. 7,050,908, which is hereby incorporated herein by reference. This may be achieved by modifying the aforementioned system to detect a trailer tow mode and select a threshold width value in response thereto.

The lane departure warning system 10 advantageously improves the detection of lane departure and warning thereof for a host vehicle towing a trailer in the trailer mode. According to one example, the host vehicle having a width of 79.9 inches traveling on a two-lane roadway having a lane width of 146 inches may have approximately 33 inches on each side of the vehicle 10 before a lane departure occurs, provided the vehicle is centered in the roadway. In a non-trailer mode, the lane departure warning system 10 may provide lane departure detection and warning based on the host vehicle width of 79.9 inches. In a trailer towing mode, if the host vehicle is towing a trailer having a width of 102 inches, the lane departure warning system is reconfigured to operate with the extended trailer width threshold value based on the 102 inch width, the system advantageously recalculates the distance to lane markings based on the trailer width of 102 inches to detect when the trailer departs from the lane.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A vehicle lane departure warning system having a trailer mode, said system comprising:
    an imager capturing images of a roadway proximate to a vehicle;
    an input receiving a towing signal indicative of whether the vehicle is towing a trailer;
    a processor processing the captured images and determining whether the vehicle or trailer is expected to be departing from a lane on the roadway based on the captured images and a threshold width value, wherein the processor further selects the threshold width value based on the input towing signal such that an enhanced threshold width value is employed when the vehicle is towing a trailer; and
    an output for outputting a lane departure warning signal based on the processed images and selected threshold width value.

2. The system as defined in claim 1, wherein the processor selects the threshold width value from at least a first width value indicative of a width of the vehicle and a second width value indicative of an expected width of the trailer.

3. The system as defined in claim 2, wherein the processor further selects the threshold width value from the first width value, the second width value and a third width value indicative of a different sized trailer.

4. The system as defined in claim 1, wherein the towing signal is generated when a trailer harness is connected to the vehicle.

5. The system as defined in claim 1, wherein the towing signal is generated when a user actuates an input to set the vehicle in a trailer tow mode.

6. The system as defined in claim 1, wherein the vehicle width is less than eighty inches and the trailer width is greater than eighty inches.

7. The system as defined in claim 1, wherein the processor detects lane boundary markings of a lane and determines whether the vehicle or trailer is expected to be crossing a lane boundary marking.

8. A method of detecting a vehicle departing from a lane on a roadway with a trailer mode, said method comprising the steps of:
    capturing images of the roadway proximate to the vehicle with a camera;
    processing the captured images from the camera to determine whether the vehicle or trailer is expected to be departing from a lane on the roadway based on the captured images and a threshold width value;
    monitoring an input to detect a towing signal indicative of whether the vehicle is towing a trailer;
    selecting the threshold width value based on the towing signal such that an enhanced threshold width value is employed when the vehicle is towing a trailer; and
    outputting a lane departure warning signal based on the processed images and selected threshold width value.

9. The method as defined in claim 8, wherein the step of selecting the threshold width value comprises selecting the threshold with a value from at least a first width value indicative of a width of the vehicle and a second width value indicative of an expected width of the trailer.

10. The method as defined in claim 9, wherein the step of selecting the threshold width value further comprises selecting the threshold width value from the first width value, the second width value, and a third width value indicative of a different sized trailer.

11. The method as defined in claim 8, wherein the step of monitoring an input comprises monitoring a towing signal generated when a trailer harness is connected to the vehicle.

12. The method as defined in claim 8, wherein the step of monitoring an input comprises monitoring a towing signal generated when a user actuates an input to set the vehicle in a trailer tow mode.

13. The method as defined in claim 8, wherein the vehicle width is less than eighty (80) inches and the trailer width is greater than eighty (80) inches.

14. The system as defined in claim 8, wherein the step of processing comprises detecting lane boundary markings of a lane and determining whether the vehicle or trailer is expected to be crossing a lane boundary marking.

* * * * *